United States Patent
Wright et al.

(10) Patent No.: US 10,248,773 B2
(45) Date of Patent: Apr. 2, 2019

(54) VEHICLE SECURITY ACCESSORY AND METHODS OF IDENTITY AUTHENTICATION

(71) Applicant: Gentex Corporation, Zeeland, MI (US)

(72) Inventors: Thomas S. Wright, Holland, MI (US); Steven L. Geerlings, Holland, MI (US); Marc A. Smeyers, Zeeland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 29 days.

(21) Appl. No.: 15/247,137

(22) Filed: Aug. 25, 2016

(65) Prior Publication Data
US 2017/0061110 A1 Mar. 2, 2017

Related U.S. Application Data (60) Provisional application No. 62/211,500, filed on Aug. 28, 2015.

(51) Int. Cl.
| | |
|---|---|
| G06F 7/04 | (2006.01) |
| G06F 21/32 | (2013.01) |
| G07F 19/00 | (2006.01) |
| H04W 4/04 | (2009.01) |

(52) U.S. Cl.
CPC ............ G06F 21/32 (2013.01); G07F 19/201 (2013.01); *H04W 4/046* (2013.01)

(58) Field of Classification Search
CPC ...... G06F 21/32; G07F 19/201; H04W 4/046; H04L 67/12
USPC .......................................................... 726/19
See application file for complete search history.

(56) References Cited

U.S. PATENT DOCUMENTS

| | | | | |
|---|---|---|---|---|
| 5,046,007 | A * | 9/1991 | McCrery | ................ G01D 9/005 307/10.1 |
| 6,898,299 | B1 * | 5/2005 | Brooks | .................... G06K 9/00 340/5.52 |
| 2004/0143737 | A1 * | 7/2004 | Teicher | ................ G06K 7/1095 713/167 |
| 2005/0010796 | A1 | 1/2005 | Arnouse | |

(Continued)

FOREIGN PATENT DOCUMENTS

| | | |
|---|---|---|
| WO | 2008060725 A2 | 5/2008 |
| WO | 2013064504 A1 | 5/2013 |

OTHER PUBLICATIONS

International Search Report and Written Opinion of the International Searching Authority, or the Declaration, dated Dec. 15, 2016, for International Application No. PCT/US2016/048645, filed on Aug. 25, 2016, 9 pages.

*Primary Examiner* — Samson B Lemma
(74) *Attorney, Agent, or Firm* — Price Heneveld LLP; Bradley D. Johnson

(57) ABSTRACT

An accessory configured to authenticate a transaction is disclosed. The accessory comprises a communication circuit configured to communicate with a transaction system. The accessory further comprises at least one data collection device and a processor. The processor is in communication with the communication circuit and the data collection device. The processor is configured to compare captured data captured by the data collection device with stored data to generate an authentication of a previously identified operator.

18 Claims, 6 Drawing Sheets

(56) References Cited

U.S. PATENT DOCUMENTS

| | | | |
|---|---|---|---|
| 2008/0022365 A1* | 1/2008 | Chae | G06F 21/32 726/2 |
| 2011/0231310 A1* | 9/2011 | Roberts | G06F 21/316 705/40 |
| 2014/0191842 A1* | 7/2014 | McQuade | H04L 9/3215 340/5.2 |
| 2014/0267741 A1* | 9/2014 | King | H04N 7/183 348/156 |
| 2014/0306799 A1* | 10/2014 | Ricci | B60Q 1/00 340/5.83 |
| 2014/0327778 A1* | 11/2014 | McQuade | G08G 1/0175 348/156 |
| 2015/0220916 A1* | 8/2015 | Prakash | G06Q 20/36 705/41 |

* cited by examiner

VEHICLE SECURITY ACCESSORY AND METHODS OF IDENTITY AUTHENTICATION

CROSS-REFERENCE TO RELATED APPLICATION

This application claims priority to and the benefit under 35 U.S.C. § 119(e) of U.S. Provisional Patent Application No. 62/211,500, filed on Aug. 28, 2015, entitled "VEHICLE SECURITY ACCESSORY AND METHODS OF IDENTITY AUTHENTICATION," the entire disclosure of which is hereby incorporated herein by reference.

TECHNOLOGICAL FIELD

The present disclosure relates generally to a security accessory for a vehicle and more particularly relates to security accessory configured to assist in an authentication of a transaction.

SUMMARY

In one aspect of the present disclosure, an accessory configured to authenticate a transaction is disclosed. The accessory comprises a communication circuit configured to communicate with a transaction system. The accessory further comprises at least one data collection device and a processor. The processor is in communication with the communication circuit and the data collection device. The processor is configured to compare captured data captured by the data collection device with stored data to generate an authentication of a previously identified operator.

In another aspect of the present disclosure, an authentication accessory for a vehicle is disclosed. The accessory is configured to authenticate a transaction. The accessory comprises a communication circuit configured to communicate with a transaction system, at least one sensor configured to capture captured identifying information characteristic of an operator of the vehicle, and a memory configured to store stored identifying information characteristic of the operator. A processor is in communication with the memory, the communication circuit, and the data collection device. The processor is configured to initiate the sensor to capture the captured identifying information and compare the captured identifying information to the stored identifying information. Based on the comparison, the processor generates an authentication verifying an identity of the operator and communicates the authentication to the transaction system.

In yet another aspect of the present disclosure, an authentication accessory for a vehicle is disclosed. The accessory is configured to authenticate a transaction. The accessory comprises a communication circuit configured to communicate with a transaction system, at least one sensor configured to capture captured identifying information characteristic of an operator of the vehicle, and a memory configured to store stored identifying information characteristic of the operator. A processor is in communication with the memory, the communication circuit, and the data collection device. The processor is configured to initiate the sensor to capture the captured identifying information and compare the captured identifying information to the stored identifying information. Based on the comparison, the processor is configured to generate a first authentication verifying an identity of the operator. Further the processor is configured to generate a second authentication verifying an identity of the operator based on vehicle-metric data.

These and other features, advantages, and objects of the present device will be further understood and appreciated by those skilled in the art upon studying the following specification, claims, and appended drawings.

DETAILED DESCRIPTION OF EMBODIMENTS

It is to be understood that the various accessories, devices, systems, and methods discussed herein may assume various orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The disclosure provides for various embodiments of a security accessory configured to provide at least one authentication, which may be referred to as an authentication task, to assist in a secure transaction with a transaction system. The security accessory may be configured to receive various inputs, data, and/or information that may be associated with or attributed to an operator of the vehicle. In some embodiments, the authentication task may correspond to a comparison or verification of authentication information in the form of biometric data collected by the security accessory. The authentication information may also correspond to vehicle-based measurements or metrics, which may be referred to as vehicle-metric data as described herein. The vehicle-metric data may correspond to any information that may be associated with the operator and/or the vehicle. The vehicle-metric data may be based on a condition or identity of the vehicle (e.g. a vehicle identification number or VIN, registration, title, etc.), information gathered by various system or accessories of the vehicle, associated with the vehicle, or an environment proximate thereto, etc. Such vehicle-metric data may include but is not limited to an identity of an owner of the vehicle, a common locale or path traveled by the vehicle, and various settings or operating characteristics that may correspond to the vehicle or the operator of the vehicle. As discussed in the following disclosure, the security accessory may provide for improved security based on data received or captured by the security accessory.

Figure 1:
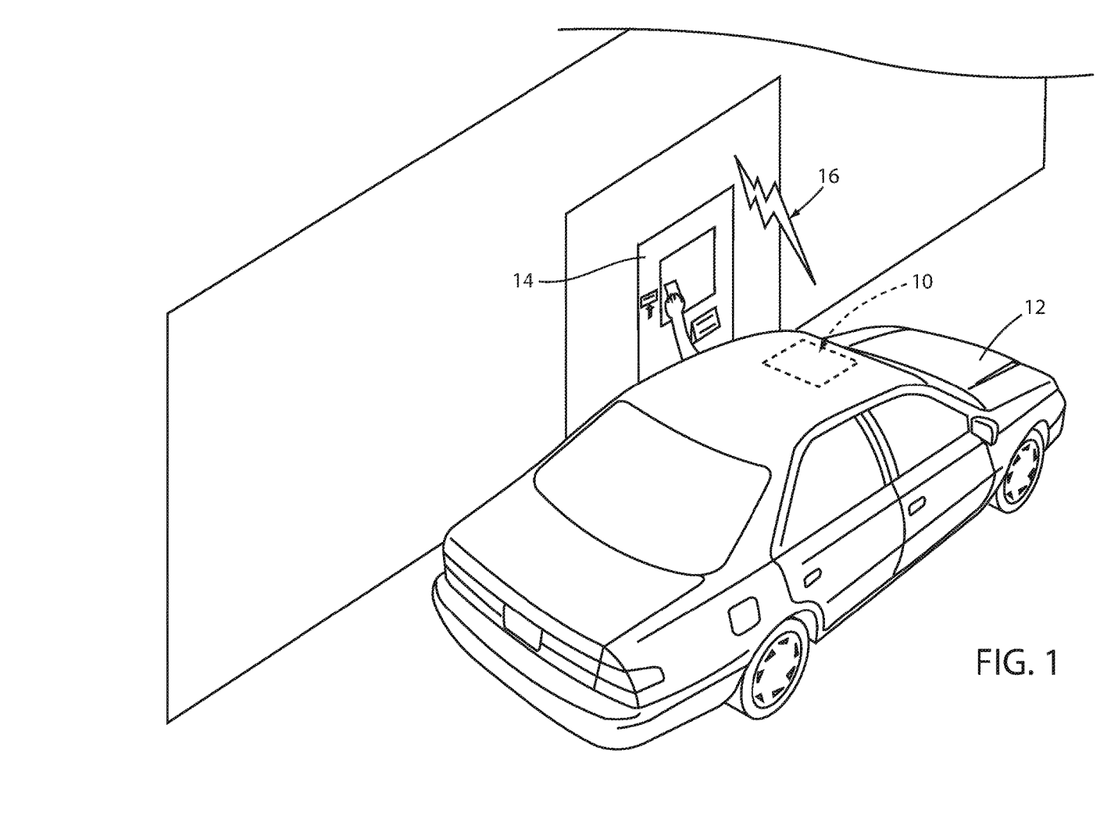
FIG. 1 is a projected view of a security accessory for a vehicle demonstrating a secure transaction with a transaction system.

Referring now to FIG. 1, a projected view of a security accessory 10 for a vehicle 12 is shown demonstrating a secure transaction with a transaction system 14. The transaction system 14 may correspond to any form of kiosk, drive-thru transaction system, automated service center, or any other form of system or device that may be configured to process a transaction or communicate information. For example, the transaction system 14 may correspond to drive-thru service providers of goods or services, such as a bank, a fueling station, a restaurant, grocery store, etc. In an exemplary embodiment, the transaction system 14 may correspond to a system that may seek to provide security by authenticating an identity of a party in a corresponding transaction.

For example, in a conventional transaction with an automated teller machine (ATM) a party may be identified by a card (e.g. a bank or debit card) and the transaction may be authenticated by entering a pin or password. However, the pin or password may become compromised such that a transaction utilizing the pin or password is not secure. The security accessory 10 discussed herein may provide for additional security to ensure that a transaction is associated with a genuine or authentic party authorized to participate in the transaction. The security accessory 10 may provide for one or more of a primary or ancillary forms of authentication based on an authentication transmission 16, which may be communicated from the security accessory 10 to the transaction system 14. In this way, the disclosure provides for improved security for various transactions.

Referring again to the specific example demonstrated in FIG. 1, the security accessory 10 may transmit data in the authentication transmission 16 such that the transaction system 14 may authenticate a transaction based on the data. The data may correspond to biometric and/or vehicle-metric data that may be captured and or input into an input device or user interface of the security accessory 10. Additionally, in some embodiments, the security accessory may be configured to identify, learn, or be programmed to identify and/or authenticate an operator or occupant of the vehicle 12. Once the operator or occupant of the vehicle 12 is authenticated by the security accessory 10, the security accessory 10 may transmit an authentication of an identity to the transaction system 14 via the authentication transmission 16. The transaction system 14 may then utilize the authentication from the security accessory 10 as at least one factor in verifying an identity of a party to a pending transaction.

The security accessory 10 may correspond to any accessory in communication with the vehicle 12 and/or an integral component of the vehicle 12. In some implementations, the security accessory 10 may correspond to a trainable wireless accessory configured to control a remote electronic system as demonstrated in FIG. 2. In an exemplary embodiment, the security accessory may correspond to a Homelink® trainable transceiver and may be constructed according to one or more embodiments disclosed in U.S. Pat. Nos. 6,091,343; 5,854,593 or 5,708,415, which are herein incorporated by reference in their entirety.

Figure 2:
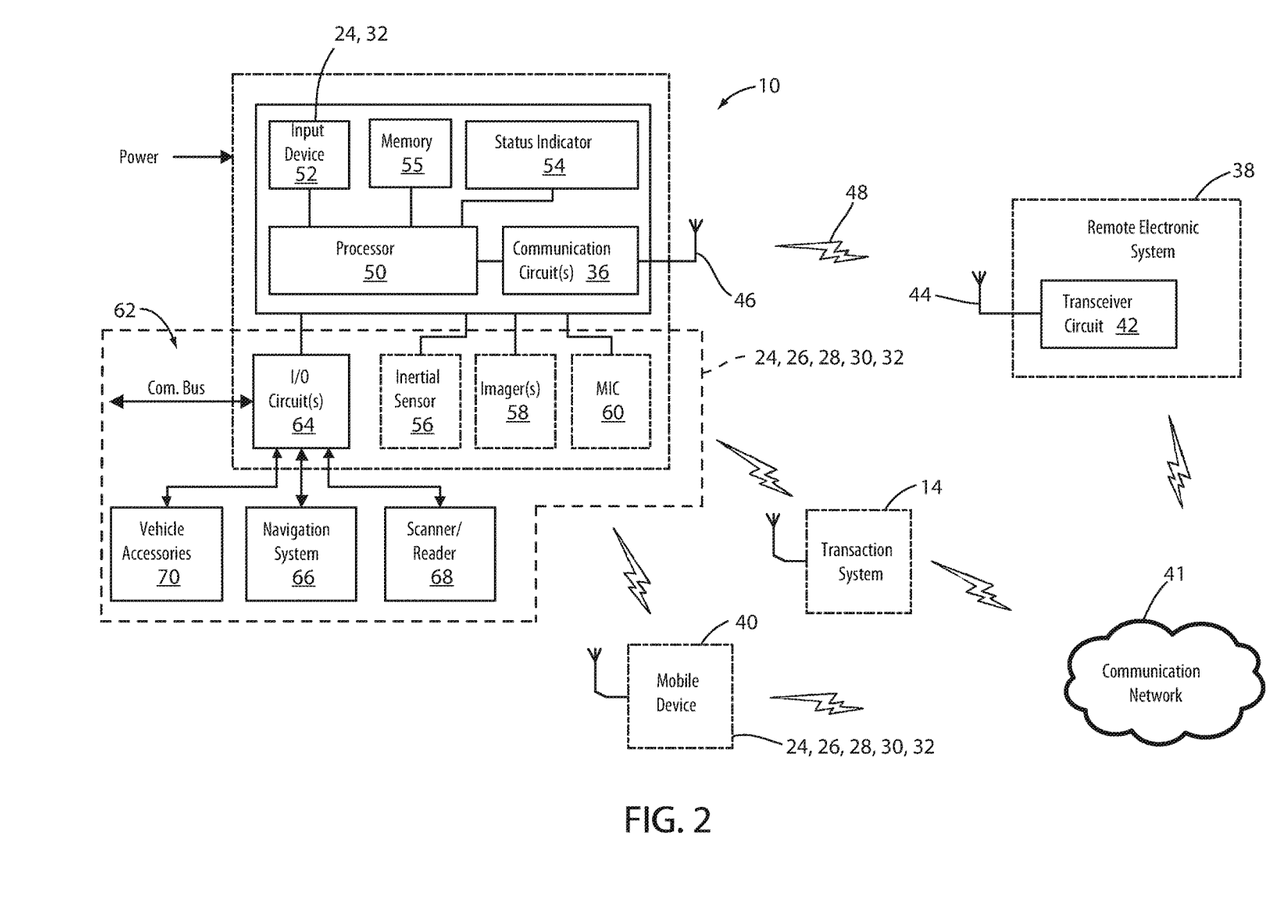
FIG. 2 is a block diagram of the security accessory for a vehicle demonstrating at least one communication interface configured to authenticate a transaction.

Referring now to FIG. 2, a block diagram of the security accessory 10 for the vehicle 12 is shown demonstrating at least one communication interface configured to authenticate a transaction. The security accessory 10 may incorporate or be in communication with various input devices 24, transducers 26, sensors 28, and vehicle accessories 30. Such devices may be commonly referred herein as data devices 32 for clarity. The data devices 32 may be configured to capture data and/or receive inputs from various vehicle systems and/or be configured to capture and communicate data to the security accessory 10. The security accessory 10 may then authenticate and determine an identity of a party to a transaction with the transaction system 14 and/or communicate data that may be utilized to authenticate the party.

In an exemplary implementation, the security accessory 10 may comprise one or more communication circuits 36 that may be configured to communicate with the transaction system 14, the remote electronic system 38, and/or a mobile device 40. The one or more communication circuits 36 may correspond to various forms of wireless communication, for example Bluetooth, Bluetooth Low-energy (BT-LE), Near Field Communication (NFC), and/or the like. Examples of standards related to NFC include ISO 18000-3, ISO 13157, and the like, and examples of standards related to BT-LE include IEEE 802.15.1 and the like. Additionally, the communication circuits may be configured to operate using one or more of a plurality of radio access technologies including one or more of the following: Long Term Evolution (LTE), wireless local area network (WLAN) technology, such as 802.11 WiFi and the like, and other radio technologies as well. In some embodiments, the communication protocol(s) of the one or more communication circuits 36 may be configured to communicate with the transaction system 14, the remote electronic system 38, and/or a mobile device 40. As such, each of the transaction system 14, the remote electronic system 38, and/or a mobile device 40 may comprise one or more controllers and/or circuits configured to communicate with the communication circuits of the security accessory 10.

In various implementations, the security accessory 10 may be configured to utilize the one or more communication circuits 36 to transmit data to the transaction system 14 and/or the mobile device 40 such that the transaction system 14 and/or the mobile device 40 may utilize the data to authenticate a transaction. The data may correspond to various forms of data, which may correspond to biometric data or vehicle-metric data as discussed herein. Biometric data may correspond to an iris recognition, fingerprint recognition, voice recognition, face recognition, gesture recognition or any other biometric information that may be captured by the data devices. Vehicle-metric data may correspond to data attributed to an identifier of the vehicle 12, the operation of the vehicle 12, an operating environment of the vehicle 12, an interaction between an operator and/or passenger and the vehicle 12, etc. In this way, the transaction system 14 and/or the mobile device 40 may authenticate an identity of a party to a transaction with the transaction system 14.

In implementations that utilize the mobile device 40 as a component in an authentication process or for an authentication task with the transaction system 14, the security accessory 10 may be in communication with a communication network 41 operable to connect to a server, the internet, and/or a portal configured to receive an authentication. For example, the mobile device 40 may comprise one or more communication circuits similar to those discussed herein to communicate with a private server for an institution or transaction security provider for the institution affiliated with the transaction system 14. Further details describing the interaction among the security accessory 10, the transaction system 14, and/or the mobile device are discussed in reference to FIGS. 3 and 4.

In some embodiments, the security accessory 10 may be configured to communicate with the transaction system 14 via the one or more communication circuits 36 to communicate the authentication data. As such, the transaction system 14 may comprise one or more communication circuits operable to communicate with the one or more communication circuits 36 of the security accessory 10. In this way, the security accessory may be configured to utilize the data devices 32 to capture or otherwise receive data to assist in the authentication of a party to a transaction. The security device 10 may be configured to communicate the data to the transaction system 14, for example biometric and/or vehicle-metric data, such that the transaction system 14 may authenticate a party to a transaction.

In some embodiments, the security accessory 10 may be configured to compare and/or process the data received from the data devices 32 to authenticate or identify a security confidence corresponding to a percent likelihood that an identity of a party to a transaction is authentic. In this way, the security accessory 10 may also be configured to identify and communicate the authentication or security confidence of an authentication to the transaction system 14. In some embodiments, the authentication occurring within the security device may be beneficial because the security device 10 may not transmit data utilized for an authentication and may only transmit the authentication or security confidence corresponding to a particular transaction.

For example, the security accessory 10 may be configured to process authentication data in the form of vehicle-metric and/or biometric data to identify an identity of a passenger of the vehicle 12 with a level of security confidence. The security accessory 10 may then transmit this data to the transaction system 14 in proximity thereto. Based on the security confidence and other security factors, the transaction system 14 may determine whether to authorize a transaction. In this configuration, the security device 10 may be operable to limit a transmission of data to a security confidence to the transaction system 14.

Still referring to FIG. 2, in an exemplary configuration, the security accessory 10 may correspond to and/or be incorporated as a component of a trainable wireless accessory. In such embodiments, the security accessory 10 may be configured to communicate with a remote electronic system 38. The remote electronic system 38 may correspond to any of a plurality of remote electronic systems, such as, a garage door opener, a security gate control system, security lights, remote lighting fixtures or appliances, a home security system, etc. For example, the remote electronic system 14 may correspond to a garage door opener that may be utilized to access a residential or commercial garage. The security accessory 10 may be configured to wirelessly communicate with the remote electronic system 38 via the one or more communication circuits 36.

The communication circuit 36 may be configured to transmit and/or receive signals communicated from the security accessory 10 to a remote transceiver circuit 42 of the remote electronic system 38. As such, the security device 10 may be operable to communicate with the remote transceiver circuit 42 via wireless signals. The wireless signals may correspond to radio frequency (RF) signals, for example ultra-high frequency (UHF) band signals, and may also correspond to infrared signals, and/or various other wireless signals. The wireless signals of the remote transceiver circuit 42 may be emitted and received from a remote antenna 44 to communicate with a local antenna 24 of the security accessory 10.

The remote transceiver circuit 42 may be configured to communicate signals in the form of control signals via a wireless transmission 48 between the remote antenna 44 and the local antenna 46. For example, the wireless signals may comprise control data configured to cause a garage door opener to open or close a garage door. Additionally, the communication circuits 36 may be operable to communicate status signals having status data indicating a status of remote electronic system 38. Such status signals may correspond to a variety of information, such as a success or failure indication corresponding to control data sent from the transceiver circuit local antenna 46. Status signals may further correspond to an indication of whether a garage door is open or closed or moving between open and closed position, whether a security system is armed or disarmed, whether a light is on or off, etc.

The security accessory 10 may comprise a processor 50 configured to control various components and/or integrated circuits of the system 12, to store data in memory, operate preprogrammed functionality, send and receive wireless signals, etc. The processor 50 may include various types of control circuitry, digital and/or analog, and may include a microprocessor, microcontroller, application-specific integrated circuit (ASIC), or other circuitry configured to perform various input/output, control, analysis, and other functions to be described herein. The processor 50 may be coupled to an input device 52, which includes one or more switches (see FIGS. 2 and 3), but may alternatively include other user input devices, such as, switches, knobs, dials, alpha or numeric input devices, etc.

The processor 50 may further be coupled to a status indicator 54. In various implementations, the status indicator 54 may correspond to one or more light-emitting diodes (LED), a display element, etc. The status indicator 54 may include other or additional display elements, such as a liquid crystal display (LCD). The status indicator 54 may include a single multi-colored LED (e.g., green, red, and yellow) or multiple LEDs, each of which may represent a different color. The status indicator 54 may be configured to display information corresponding to the status of the remote electronic system 38, the transaction system 14, the mobile device 40 and/or the security accessory 10. For example, the status indicator 54 may be configured to display a color or message to communicate a control recognition from the remote electrical system 38 and a confirmation of the authentication transmission 16 or transaction status from the mobile device 40 and/or the transaction system 14.

In an exemplary embodiment, the security accessory 10 may be configured to function as a trainable wireless accessory. In such implementations, the security accessory is configured to receive one or more characteristics of an activation signal sent from an original transmitter. An original transmitter is a transmitter, typically a hand-held transmitter sold with the remote electronic system 38. The original transmitter is configured to transmit an activation signal at a predetermined carrier frequency having control data configured to actuate the remote electronic system 38. For example, the original transmitter may be a hand-held garage door opener transmitter configured to transmit a garage door opener signal at a frequency, such as 315 megaHertz (MHz), wherein the activation signal has control data, which can be a fixed code or a cryptographically-encoded code. The remote electronic system 38 is configured to open a garage door, for example, in response to receiving the activation signal from the original transmitter.

The one or more communication circuits 36 are configured to receive one or more characteristics of the activation signal from the original transmitter or from another source. The one or more characteristics may include the frequency, control data, modulation scheme, etc. In this configuration, the one or more communication circuits 36 may be configured to learn at least one characteristic of the activation signal by receiving the activation signal, determining the frequency of the activation signal, and demodulating the control data from the activation signal. The security accessory 10 may correspond to a Homelink® trainable transceiver and may be constructed according to one or more embodiments disclosed in U.S. Pat. Nos. 6,091,343, 5,854, 593 or 5,708,415, which are herein incorporated by reference in their entirety.

In some embodiments, the security accessory 10 may be configured to receive one or more characteristics of the activation signal by other methods. For example, the one or more characteristics of the activation signal may be preprogrammed into a memory 55 in communication with the processor 50 during manufacture or may be input via the input device 52. Accordingly, the security accessory 10 may be programmed by alternate or optional methods that may not require receiving the activation signal from an original transmitter in order to identify characteristics of the activation signal. The security accessory 10 may receive or identify the characteristics of the activation signal by various methods and store the characteristics of the activation signal in the memory 55.

The communication circuit 36 may be configured, via the processor 50, to generate a carrier frequency at any of a number of frequencies, some of which may correspond to the ultra-high frequency range. The carrier frequency may be approximately between 280 and 470 megaHertz (MHz), and in some implementations may be between 868 and 929 MHz. The control data may be modulated on to the carrier frequency signal via frequency shift key (FSK) or amplitude shift key (ASK) modulation and may utilize additional modulation techniques. The control data on the wireless control signal may be a fixed code, a rolling code, or various cryptographically encoded control codes suitable for use with remote electronic systems.

Still referring to FIG. 2, the security accessory 10 may be configured to capture data for an authentication task. In such implementations, the security accessory 10 may comprise various data devices including but not limited to the input device 52, an inertial sensor 56, one or more imagers 58, a microphone 60, and various other sensors or inputs that may be implemented in the vehicle 12. Data received by each of the sensors or data devices 32 may be processed by the processor 50 to identify or determine an identity of an occupant or operator of the vehicle 12. The authentication may then be transmitted to the transaction system 14 to authenticate a transaction.

The input device 52 may be configured to receive a code or pin that may be utilized by the security accessory 10 to provide for at least one security criterion from which the processor 50 may generate an authentication of an identity of an operator or occupant of the vehicle 12. The processor 50 may be configured to prompt an occupant of the vehicle for an input into the input device 52 via the status indicator 54, or any other indicator or device having a display in communication with the security device 10 (e.g. a display of a navigation system). In response to the prompt, the occupant may enter a code to authenticate his or her identity. In this way, the security device provides for a system operable to authenticate an identity of the occupant based at least on the predetermined or previously configured pin received by the input device 52.

The inertial sensor 56 may correspond to any form of inertial measurement device, for example an accelerometer, a gyroscope, an inertial measurement unit (IMU), etc. The motion data generated by the inertial sensor 56 may be communicated to the processor 50 and stored in the memory 55. The motion data may correspond to acceleration, deceleration, and turning rates of the vehicle 12, which may be utilized by the processor 50 in combination with various additional security criteria or metrics, to determine and authenticate an identity of an operator of the vehicle 12. As discussed herein, the motion data or statistics corresponding to a specific driver may correspond to a driving signature that may be identified by the processor 50.

Additional driving characteristics that may be utilized as security criteria may include data received from a communication bus 62 via one or more input-output (I/O) circuits 64 of the security accessory 10. Such data may correspond to turn signal activation, seat position data, temperature or climate control settings, radio station settings, seatbelt usage, seat weight-sensor data, high-beam activation for headlights, or any other information that may be measured and communicated to the security accessory 10. Any of the driving characteristics or settings corresponding to a particular operator of the vehicle 12 may correspond to vehicle-metrics associated with the particular driver. Such vehicle-metrics may be utilized to identify a particular driver of the vehicle 12 or at least be processed by the processor 50 as security criteria that may be utilized in part to determine if an operator of the vehicle is an owner or recognized operator of the vehicle 12. The security criteria may then be utilized by the processor 50 to authenticate the identity of the driver of the vehicle 12 and communicate the authentication to the transaction system 14.

For example, during operation of the vehicle 12, the processor 50 may record various driving statistics and store a driving profile or signature for a particular, previously identified operator. The driving profile may correspond to data stored in the memory 55 corresponding to various vehicle-metric data as discussed herein. The processor 50 may utilize the vehicle-metric data as security criteria in combination with biometric data captured by one or more of the input devices 32 of the security accessory 10 as additional security criteria to improve a confidence of an authentication. In this way, the processor 50 may compare the vehicle-metric data and the biometric data gathered for a current operator of the vehicle 12 with data corresponding to a previously identified or authenticated driver to authenticate the operator of the vehicle 12. The authentication may then be communicated to the transaction system 12 or the mobile device 40 to authenticate a transaction with the transaction system 14.

The processor 50 may receive audio data from the microphone 60. The voice data may be compared by the processor to a voice profile for an previously recorded and authenticated operator of the vehicle 12. The comparison may identify and authenticate an identity of a passenger or operator of the vehicle 12. The voice data may also be utilized as one of a plurality of security criteria to authenticate an identity of a passenger of the vehicle 12. As such, the voice data may be utilized alone or in combination with the various biometric, vehicle-metric, and/or various other data as discussed herein to authenticate the identity of a passenger recorded in the voice data.

The at least one imager 58 may correspond to a forward directed imager configured to capture image data in front of the vehicle 12, an interior passenger compartment directed sensor, and/or a rearward directed or backup sensor. In some implementations, the imager 58 may correspond to a forward directed sensor configured to identify at least one characteristic that may authenticate a transaction as discussed further in reference to FIG. 5. Additionally, the imager 58 may correspond to an interior imager configured to capture images of an operator or passenger of the vehicle 12. The images of the operator or passenger of the vehicle 12 may be utilized by the processor 50 to compare to previously recorded or saved image data in the memory 55 for a previously identified operator or passenger of the vehicle 12.

The processor 50 may be operable to compare current data captured by the imager 58 with the saved image data or various identification profiles processed therefrom to identify a passenger of the vehicle 12. The comparison may correspond to a face recognition, iris recognition, gesture recognition, or any other form of identification that may be attributed to image data. Once again, the identification may be utilized as a determining factor or as one of many security criteria by the processor 50 of the security accessory 10 to generate and communicate an authentication of an identity to the transaction system 14. As discussed herein, the authentication may be determined based on at least one of numerous security criteria in order to identify and authenticate a party to a transaction with the transaction system 14.

Still referring to FIG. 2, in some embodiments, the security accessory 10 may be utilized in combination with the mobile device 40 for a dual device authentication. As discussed later in reference to FIG. 6, the mobile device may comprise an inertial sensor 56, a microphone 60, and/or imagers 58. Utilizing similar sensors, the mobile device 40 may be configured to capture data corresponding to the driving statistics from the inertial sensor 56, the voice data from the microphone 60, and/or the one or more imagers 58 to identify that the operator of the vehicle 12 are moving or located in the same area. Such data may provide for a dual authentication based on the security device 10 authenticating the operator and/or passenger of the vehicle 12, and also by similarly authenticating a known user or owner of the mobile device 40. The dual authentication may be communicated between the security accessory 10 and the mobile device 40 such that either or both the security accessory 10 or the mobile device 40 may confirm the dual authentication and communicate the authentication to the transaction system 14. Additionally, each of the security accessory 10 and the mobile device 40 may be configured to independently authenticate and/or generate a security confidence to communicate to the transaction system such that one or more processors of the transaction system 14 may compare the data to authenticate a transaction.

In some implementations, the dual authentication may also correspond to a comparison of images or audio data corresponding to a common environment of the vehicle 12 and the mobile device. For example, corresponding image data and/or voice data may be captured by the imager 58 and/or microphone 60 of the security accessory and the imager and/or microphone of the mobile device 40. The image data and/or audio data may be communicated to a processor (e.g. the processor 50 via the communication circuits 36) such that image data corresponding to a current location, appearance or sound profile of the interior or exterior of the vehicle 12 may be compared to achieve another form of dual authentication.

Still referring to FIG. 2, in some embodiments, the control system 12 may be in communication with one or more additional systems of the vehicle via the one or more input-output (I/O) circuits 64. The I/O circuits 64 may be in communication with various devices or vehicle accessories. For example, the I/O circuits 64 may be in communication with a navigation system 66, a scanner/reader 68 and any other form of vehicle accessory 70 or device may be utilized to collect data corresponding to the vehicle 12, an operator or passenger of the vehicle 12, and/or a location or interaction of a passenger and the vehicle 12. The data communicated to the processor 50 may be utilized in a wide variety of ways to assist in an authentication of a transaction with the transaction system 14.

The processor 50 may receive location data from a GPS module incorporated in the security accessory (not shown) and/or the navigation system 66. The location data may be utilized by the processor to compare with previously recorded geographic data and map data stored in the memory 55. The processor 50 may compare the current data to the previously saved geographic data to determine if a pending transaction is located along a common path or region commonly traveled by the vehicle 12. In this way, the processor 50 may identify and compare yet another security metric to improve a confidence of an authentication. Additionally, by utilizing this geographic authentication in combination with one or more of the additional security criteria discussed herein, the security accessory may provide for improved confidence in the authentication, which may be communicated to the transaction system 14 to authenticate a transaction.

The scanner/reader 68 may correspond to a biometric scanner configured to capture biometric data. For example, the scanner/reader 68 may correspond to an iris imager or scanner, fingerprint scanner, face imager or scanner, etc. Similar to the various forms of vehicle-metric and biometric data discussed herein, data captured by and/or associated with image data captured by the scanner/reader 68 may be saved in the memory 55 and associated with a taught or programmed identity of an operator or passenger associated with the vehicle 12. In this way, the security accessory 10 may utilize data corresponding to the scanner/reader 68 as yet another security criterion in the authentication of an operator or passenger of the vehicle 12.

Additional driving and operational statistics of the vehicle 12 may be communicated to the processor 50 via the communication bus 62. For example, the processor may be configured to receive a vehicle ignition or activation indication; a vehicle speed; a drive state of forward, reverse, or neutral/park; a location of the vehicle identified by a GPS module or alternative positioning module in communication with the control module; etc. In this way, the security accessory may utilize various forms of data to generate an authentication corresponding to a particular identity. The various metrics and data associated with a particular operator or passenger of the vehicle 12 may be taught or previously programmed into the memory 55 via an initial programming step and/or learned based on gathering data corresponding to a particular operator of the vehicle 12 over time.

Still referring to FIG. 2, in some embodiments, an identity of the operator or passenger of the vehicle may be pre-programmed or taught via an initial programming step. In such implementations, biometric data corresponding to an operator or occupant of the vehicle 12 may be programmed by an administrator, for example an owner of the vehicle 12 or certified technician. The biometric data of the owner may be initially programmed and the owner may authorize or activate the authorization of additional occupants or operators of the vehicle 12. A certified technician may similarly be authorized to program an authentication of an identity programmed to the memory 55. Once the biometric data is stored in memory, the security accessory 10 may utilize the information to authenticate the identity of the operator or occupant of the vehicle 12.

In some implementations, the processor 50 may also be configured to learn and improve an authentication confidence by identifying characteristic driving behavior and/or settings (e.g. vehicle-metrics) associated with an identity of an occupant or operator of the vehicle 12. For example, in some embodiments, an operator of the vehicle 12 may be initially identified based on biometric or vehicle-metric data associated with an identity profile previously stored in the memory 55. The processor 50 may then record and associate various additional biometric and vehicle-metric data received from the various data devices to identify and improve the identification confidence of the operator. The confidence may increase as various security metrics corresponding to the operator are identified and stored in the memory 55. In this way, the security accessory 10 may learn and improve the security confidence of an authentication of an identity of the operator and communicate the confidence to the transaction system 14.

Figure 3:
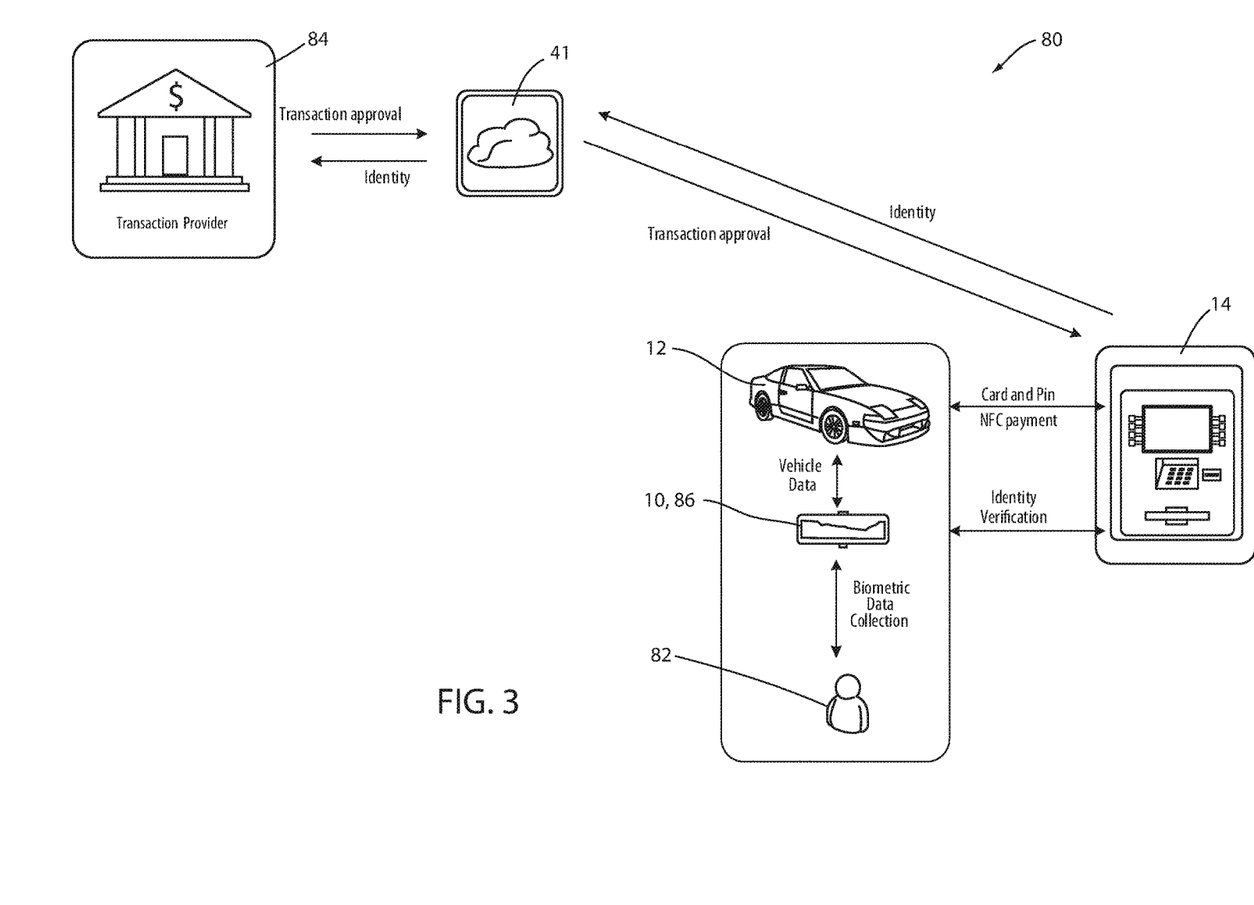
FIG. 3 is an exemplary diagram of a transaction authentication method implemented by a security accessory for a vehicle.

Referring now to FIG. 3, an exemplary diagram of a transaction authentication method 80 is shown. The method 80 may begin in response to the vehicle 12 approaching the transaction system 14. An authentication by the security accessory 10 may then be triggered by a communication between the transaction system 14 and the security accessory 10. In response to the communication from the transaction system 14, the processor 50 of the security accessory 10 may identify a party 82 to the transaction. The security accessory 10 may identify the party 82 based on biometric data and/or vehicle-metric data captured by or otherwise received from one or more of the data devices 32, which may include data communicated to the processor via the input device 52, the communication bus 62, and/or the I/O circuits 64.

Additionally, upon arriving at the transaction system 14, the party 82 to a forthcoming transaction may insert a card, for example a membership card, credit card, ATM/debit card, or any other identifier that may be recognized by the transaction system 14. In some implementations, the party 82 may even utilize the mobile device 40 to initiate a transaction via one or more wireless communication methods, for example an NFC transaction. The party 82 may then optionally be prompted by the transaction system 14 to enter a pin or code that may serve as an initial security criterion to authenticate the identity of the party 82.

The security accessory 10 may, also or alternatively, process various biometric or vehicle-metric data to identify the party 82. Once the party 82 is identified by the processor 50 as discussed herein, the security accessory 10 may authenticate the identity of the party 82 by utilizing various biometric and/or vehicle-metric data to authenticate the identity of the party 82. The security device 10 may then communicate the authentication to the transaction system 14 via the one or more communication circuits 36. In this way, the security device 10 may provide for a greatly improved security confidence by transmitting the authentication, which may be utilized alone or in combination with the pin or code input into the transaction system 14. As such, the security accessory 10 may provide for improved security confidence in the transaction than may be associated with a simple pin authentication input into the transaction system 14. Additionally, in some embodiments, the security accessory may be configured to communicate the biometric or vehicle-metric data to the transaction system 14 for authentication.

The transaction system 14 may comprise various circuits, processors, which may utilize communication circuits and/or devices to communicate with the security accessory 10 and the communication network 41. The transaction system 14 may communicate via the communication network 41 to report usage and provide additional security tracking to a transaction provider 84. Also, it may be noted that in the exemplary embodiments illustrated in FIGS. 3 and 4, the security accessory 10 is incorporated at least in part in a display device 86 that may correspond to a rear-view display device or mirror for the vehicle 12.

Figure 4:
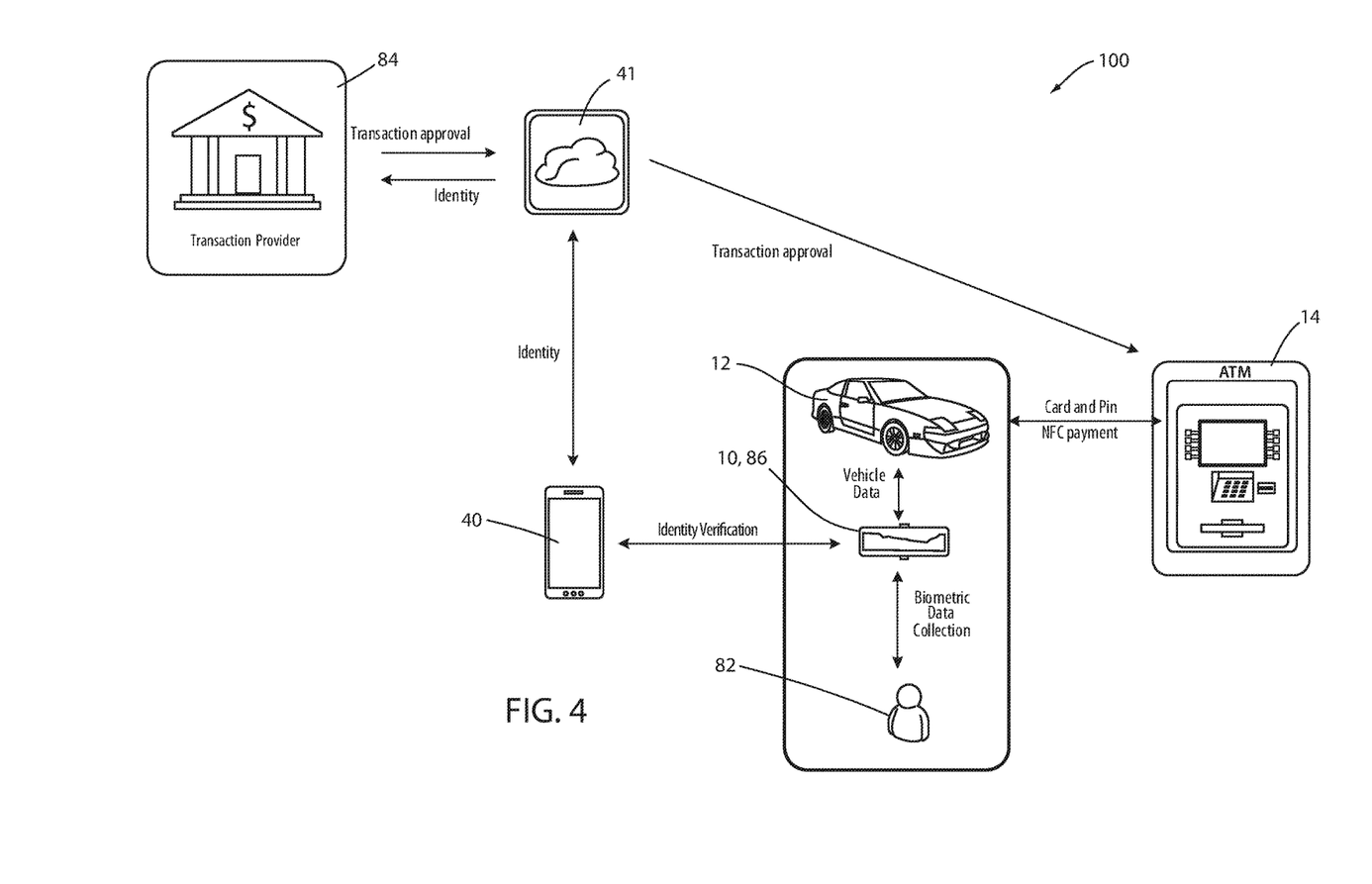
FIG. 4 is an exemplary diagram of a transaction authentication method implemented by a security accessory for a vehicle.

Referring now to FIG. 4, an exemplary diagram of a transaction authentication method 100 is shown. The method 100 may begin in response to the vehicle 12 approaching the transaction system 14. An authentication by the security accessory 10 may then be triggered by a communication received by the security accessory 10 from the mobile device 40. The communication from the mobile device 40 may be triggered by the party 82 in response to the transaction system 14 identifying a card inserted into or otherwise scanned by a terminal of the transaction system 14. The card may correspond to a membership card, credit card, ATM/debit card, or any other identifier that may be recognized by the transaction system 14. In some implementations, the mobile device 40 may alternately be used to initiate a transaction via one or more wireless communication methods, for example an NFC transaction.

In response to the transaction, associated with the party 82 by the card or alternate identifier, the transaction system 14 may communicate with the mobile device 40 via a local wireless connection (NFC, Bluetooth, etc.) or the communication network 41 to request an authentication of the identity of the party 82. In response to the request from the transaction system 14, the mobile device 40 may communicate with the security accessory 10 to request an authentication as discussed herein. The party may also optionally be prompted by the transaction system 14 to enter a pin or code that may serve as an initial or additional security criterion to authenticate the identity of the party 82. In the various embodiments discussed herein, the pin or code may be entered via an interface of the transaction system 14 and/or the input device 52.

In response to the communication from the mobile device 40, the processor 50 of the security accessory 10 may identify the party 82 to the transaction. The security accessory 10 may identify the party 82 based on biometric data and/or vehicle-metric data captured by or otherwise received from one or more of the data devices 32. Once the authentication is processed by the security accessory 10 such that the party 82 is identified and authenticated, the security accessory 10 may communicate the authentication as well as a security confidence to the mobile device 40, which may further communicate the authentication and the security confidence to the transaction system 14. In this way, the security device 10 may provide for a greatly improved security confidence for the transaction.

In some embodiments, the transaction system 14 and the mobile device 40 may further be in communication with the transaction provider 84. In this way, the mobile device 40 and/or the transaction system 14 may communicate via the communication network 41 to report usage and provide additional security tracking to a transaction provider 84. As discussed herein, the security accessory 10 may provide for improved security confidence in the transaction than may be associated with a simple pin authentication input into the transaction system 14.

Figure 5:
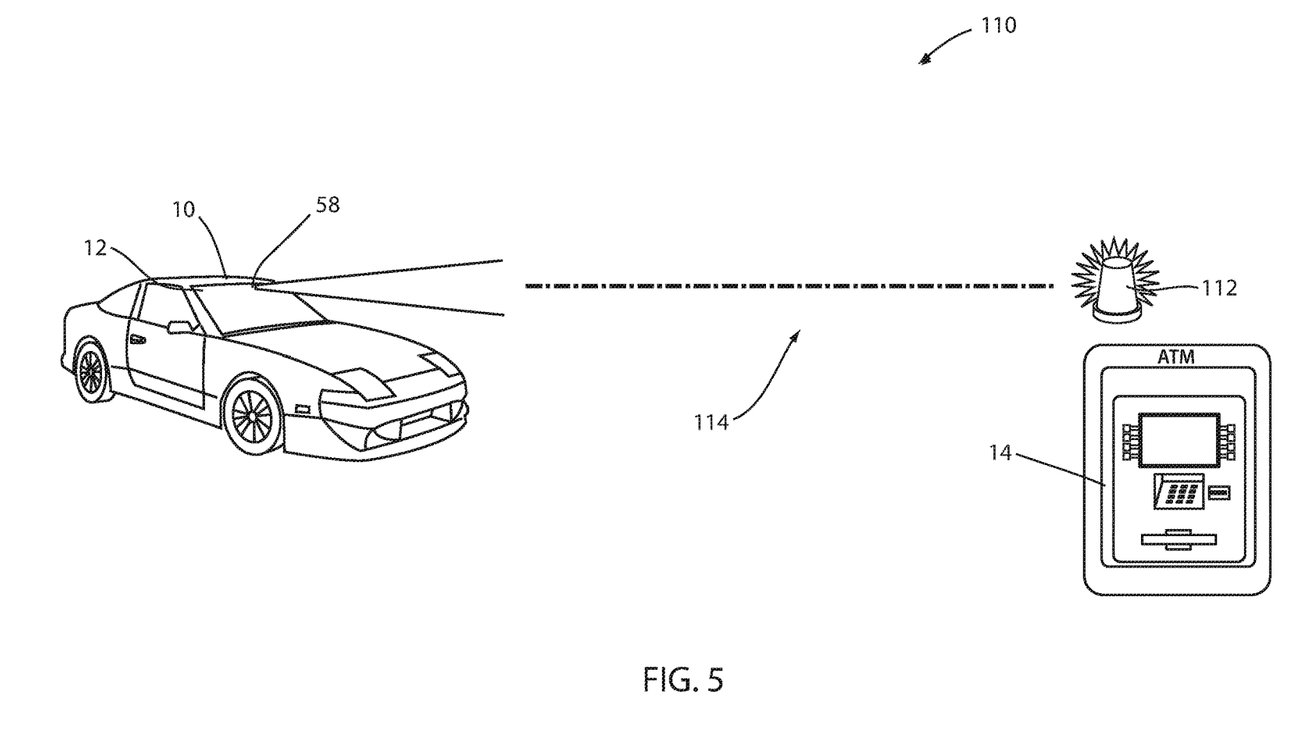
FIG. 5 is a diagram of a security criteria authentication method utilizing the security accessory.

Referring now to FIG. 5 a diagram of a security criteria authentication method 110 utilizing the security accessory 10 is shown. In some embodiments, the one or more imagers 58 of the security accessory 10 may further be configured to capture data received from the transaction system 14 in order to provide for yet another security criterion that may be utilized to improve a security confidence of an authentication by the security accessory 10. As shown in FIG. 5, at least one of the one or more imagers 58 corresponds to a forward directed imager configured to capture image data in a field of view substantially in front of the vehicle 12.

The transactions system 14 may comprise an emitter 112, for example an infra-red or any other form of light emitter configured to emit a coded light sequence 114 to the security device 10 as the vehicle 12 approaches the transaction system. Upon receiving the coded light sequence 114 from the emitter 112, the imager 58 may communicate the sequence to the processor 50 such that the processor may identify the coded light sequence 114. The coded light sequence 114 may be communicated back to the transaction system 14 via the mobile device 40, the security accessory 10, and/or the communication network 41 to provide an additional security criterion that may be utilized to improve a security confidence of the transaction pending with the transaction terminal 14.

Figure 6:
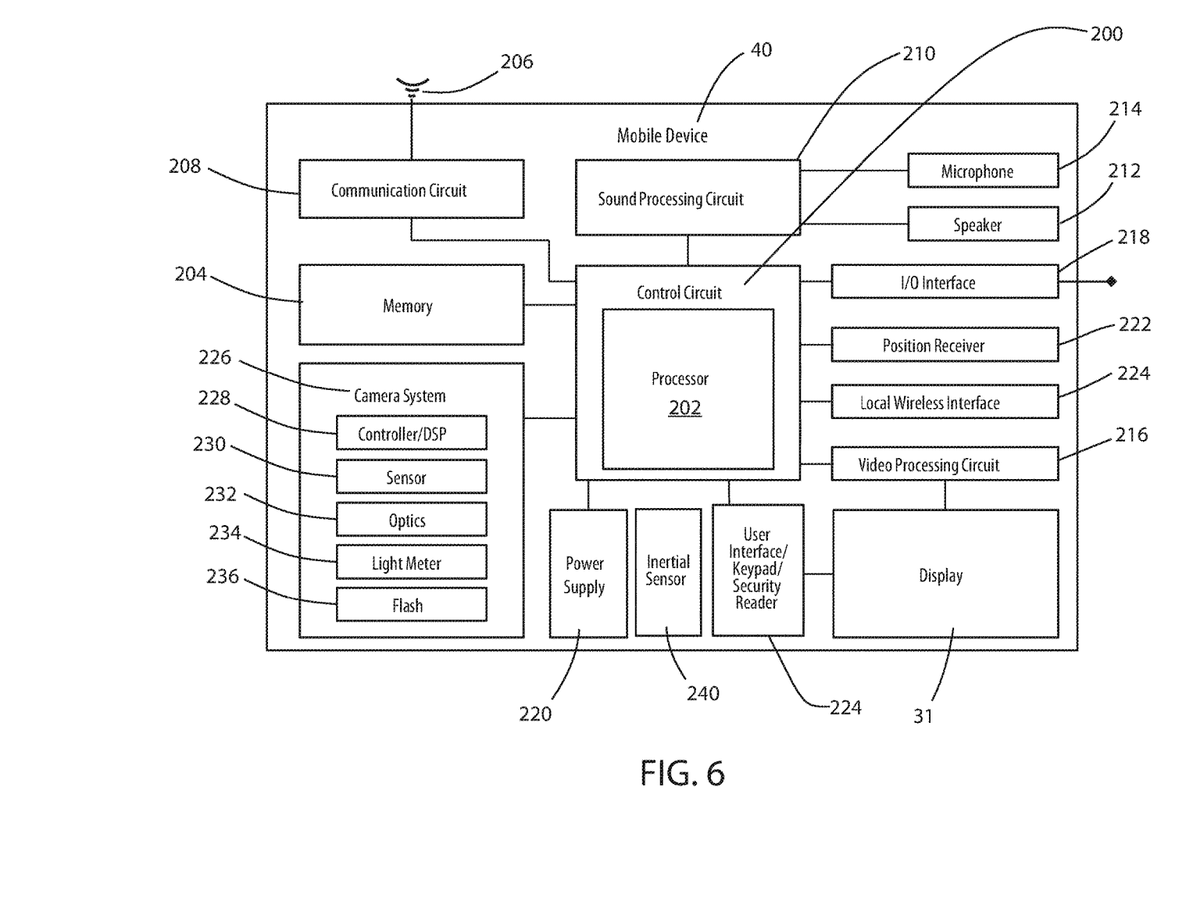
FIG. 6 is a block diagram of a mobile device that may be implemented in combination with a security device in accordance with the disclosure.

Referring to FIG. 6 a block diagram of a mobile device 40 is shown. The mobile device 40 includes a primary control circuit 200 that is configured to control the functions and operations of the mobile device 40. The control circuit 200 may include a processor 202, such as a CPU, microcontroller or microprocessor. The processor 202 executes code stored in a memory (not shown) within the control circuit 200 and/or in a separate memory, such as the memory 204, in order to carry out various operations of the mobile device 40. The memory 204 may be, for example, one or more of a buffer, a flash memory, a hard drive, a removable media, a volatile memory, a non-volatile memory or other suitable devices.

The mobile device 40 may also include an antenna 206 coupled to a wireless communication circuit 208. The communication circuit 208 includes a radio frequency transmitter and receiver for transmitting and receiving signals via the antenna 206. The radio signals may be configured to transmit data and may correspond to various communications protocols. The communication circuit 208 may be configured to operate in a mobile communications system and may be used to send and receive data and/or audiovisual content. Receiver types for interaction with a mobile radio network and/or wireless broadcast network may include GSM, CDMA, WCDMA, GPRS, MBMS, WiFi, WiMax, DVB-H, ISDB-T, etc., as well as advanced versions of these standards that may be developed at a later time.

The mobile device 40 further includes a sound signal processing circuit 210 for processing audio signals transmitted by and received from the communication circuit 208. Coupled to the sound processing circuit 210 are a speaker 212 and a microphone 214 that enable a user to listen and speak via the mobile device 40. The communication circuit 208 and sound processing circuit 210 are each coupled to the control circuit 200 so as to carry out overall operation of the mobile device 40. Audio data may be passed from the control circuit 200 to the sound signal processing circuit 210 for playback to the user. The audio data may include, for example, audio data from an audio file stored in the memory 204 and retrieved by the control circuit 200, or received audio data such as in the form of audio data from a remote server. The sound processing circuit 210 may include any appropriate buffers, decoders, amplifiers, etc.

The display 31 may be coupled to the control circuit 200 by a video processing circuit 216 that converts video data to a video signal used to drive the display 31. The video processing circuit 216 may include any appropriate buffers, decoders, video data processors, etc. The video data may be generated by the control circuit 200, retrieved from a video file that is stored in the memory 204, derived from an incoming video data stream received by the communication circuit 208 from the remote server or obtained by any other suitable method. The mobile device 40 may further comprise a user interface or keypad 224 in communication with the control circuit 200. The user interface may further function in connection with the display 31 to provide for a touch screen user interface configuration.

The mobile device 40 may further include one or more I/O interfaces 218. The I/O interfaces 218 may be in the form of a typical mobile telephone I/O interface and may include one or more electrical connectors. As is typical, the I/O interfaces 218 may be used to couple the mobile device 40 to a battery charger to charge a battery of a power supply 220 within the mobile device 40. Further, the I/O interfaces 218 may serve to connect the mobile device 40 to a personal computer or other device via a data cable for the exchange of data. The data exchanged may include image data for identifying a vehicle accessory. The mobile device 40 may receive operating power via the I/O interfaces 218 when connected to a power adapter.

The control circuit 200 may comprise one or more timers for carrying out timing functions. The mobile device 40 also may include a position data receiver 222, such as a global positioning system (GPS) receiver. The mobile device 40 also may include a local wireless interface 224, such as an infrared transceiver and/or an RF adaptor (e.g., a NFC or Bluetooth adapter), for establishing communication with an accessory (for example a vehicle accessory 10), a computer or another device. For example, the local wireless interface 224 may operably couple the mobile device 40 to a vehicle accessory having a trainable control device with an RF adapter configured to communicate programming information for a remote control device (e.g. a garage door opener remote control).

The mobile device 40 may further be coupled to a camera system 226 including a controller 228, such as a digital signal processor (DSP). The functions of the controller 228 may be controlled by the control circuit 200. The camera system 226 may further include a sensor 230 (e.g., a charged-coupled device or CCD) to image a field of view as determined by imaging optics 232 of the camera system 226. A light meter 234 may detect illumination conditions in the field of view and a flash 236 may provide supplemental illumination during the capture of image data.

The mobile device 40 may also comprise an inertial sensor 240 in communication with the processor 202. The inertial sensor 240 may correspond to any form of inertial measurement device, for example an accelerometer, a gyroscope, an inertial measurement unit (IMU), etc. The motion data generated by the inertial sensor 56 may be communicated to the security accessory 10 such that the motion data recorded by the inertial sensor 56 may be compared to the motion data recorded by the inertial sensor 240. Based on the comparison, the security device 10 and/or the mobile device 40 may determine that the mobile device 40 and the security accessory 10 are in the same vehicle 12. In this way the security confidence of an authentication may be improved.

The various communications and data transmission processes discussed herein may be transmitted and received utilizing various systems, processors, servers, and devices configured to utilize various communication standards, some of which are discussed herein. The communication standards and/or protocols described herein may be improved by various yet to be discovered technologies that may improve a security, speed, and/or efficiency of such communications. As such, various communication protocols and methods may be utilized to provide for the communications among the various systems, devices, and accessories discussed herein without departing from the spirit of the disclosure.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read-only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and also may be implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above.

It will be understood that any described processes or steps within described processes may be combined with other disclosed processes or steps to form structures within the scope of the present device. The exemplary structures and processes disclosed herein are for illustrative purposes and are not to be construed as limiting.

It is also to be understood that variations and modifications can be made on the aforementioned structures and methods without departing from the concepts of the present device, and further it is to be understood that such concepts are intended to be covered by the following claims unless these claims by their language expressly state otherwise.

The above description is considered that of the illustrated embodiments only. Modifications of the device will occur to those skilled in the art and to those who make or use the device. Therefore, it is understood that the embodiments shown in the drawings and described above is merely for illustrative purposes and not intended to limit the scope of the device, which is defined by the following claims as interpreted according to the principles of patent law, including the Doctrine of Equivalents.

What is claimed is:

1. An accessory configured to authenticate a transaction, the accessory comprising:
    a communication circuit configured to communicate with transaction system;
    at least one sensor mounted in connection with the vehicle and configured to collect verification data indicative of authentication of the transaction with the transaction system; and
    a processor in communication with the communication circuit and the at least one sensor, wherein the processor is configured to:
    communicate the verification data received from the at least one sensor to a transaction verification server as a first authentication;
    receive an authentication of the transaction from the transaction system, wherein the authentication comprises coded light data received by the at least one sensor; and
    communicate a verification of the receipt of the coded light data as a second authentication, wherein the first authentication and the second authentication are used in combination validating the transaction based on the verification data and the coded light data.

2. The accessory according to claim 1, wherein the communication circuit corresponds to a wireless communication circuit.

3. The accessory according to claim 1, wherein the at least one sensor is further configured to capture biometric data, and wherein the biometric data is used in combination with the authentication received from the transaction system to validate the transaction.

4. The accessory according to claim 3, wherein the biometric data corresponds to at least one of an iris recognition, a fingerprint recognition, a voice recognition, a face recognition, and a gesture recognition.

5. The accessory according to claim 1, wherein the at least one sensor comprises an inertial sensor configured to monitor motion statistics corresponding to the verification data indicative of a user of the vehicle.

6. The accessory according to claim 5, wherein the processor is further configured to save prior motion statistics for the user, wherein the motion statistics are compared as a security criterion to determine the authentication.

7. The accessory according to claim 1, wherein the vehicle sensor is configured to collect vehicle-metric data.

8. The accessory according to claim 3, wherein the communication circuit is further configured to communicate with a biometric verification server, wherein the biometric verification server comprises verification data identifying the at least one security criterion for a plurality of authorized users.

9. The accessory according to claim 1, wherein the processor is further configured to:
    activate the at least one sensor to capture the biometric data in response to an ignition of a vehicle.

10. The accessory according to claim 1, wherein the processor is further configured to:
    activate the at least one sensor to capture the biometric data in response to a communication with the transaction system.

11. An authentication accessory for a vehicle configured to authenticate a transaction, the accessory comprising:
    a communication circuit configured to communicate with a transaction system;

at least one sensor mounted in connection with the vehicle and configured to capture at least one identifying characteristic of a user of the vehicle; and a processor in communication with the communication circuit and the at least one sensor, wherein the processor is configured to:

initiate the sensor to capture the identifying characteristic;

communicate the identifying characteristic to a remote authentication server as a first authentication;

receive with the at least one sensor a coded light transmission from the transaction system; and     communicate a verification of the receipt of the coded light transmission as a second authentication, wherein the first authentication and the second authentication are used in combination validating the transaction based on the identifying characteristic and the coded light transmission.

12. The authentication accessory according to claim 11, wherein the remote authentication server comprises stored identifying information authenticating the identifying characteristic of the user of the vehicle.

13. The authentication accessory according to claim 12, wherein the stored identifying information is captured over a plurality of prior interactions between the authentication accessory and the user.

14. The authentication accessory according to claim 11, wherein the controller is further operable to:

initiate a financial transaction with the transaction system.

15. The authentication accessory according to claim 11, wherein the controller is further operable to:

receive a request for an authentication from the transaction system.

16. The authentication accessory according to claim 11, wherein the at least one sensor comprises a transducer configured to identify at least one of an operating condition and a location of the vehicle.

17. An authentication accessory for a vehicle configured to authenticate a transaction, the accessory comprising:

a communication circuit configured to communicate with a transaction system;

at least one sensor in connection with the vehicle; and a processor in communication with the communication circuit and the at least one sensor, wherein the processor is configured to:

initiate the sensor to capture an identifying characteristic of a user of the vehicle;

communicate the captured identifying characteristic to a remote authentication server comprising stored identifying information, wherein the remote authentication server verifies an identity of the operator based on the identifying characteristic;

receive a second authentication from the transaction system, wherein the second authentication is in the form of a coded light message authenticating the transaction; and     communicate a verification of the coded light message to the transaction system.

18. The authentication accessory according to claim 17, wherein the identifying characteristic corresponds to biometric data.

* * * * *